(No Model.) 2 Sheets—Sheet 2.
J. D. & E. E. THOMAS.
FRUIT PITTING AND SPREADING MACHINE.
No. 482,284. Patented Sept. 6, 1892.
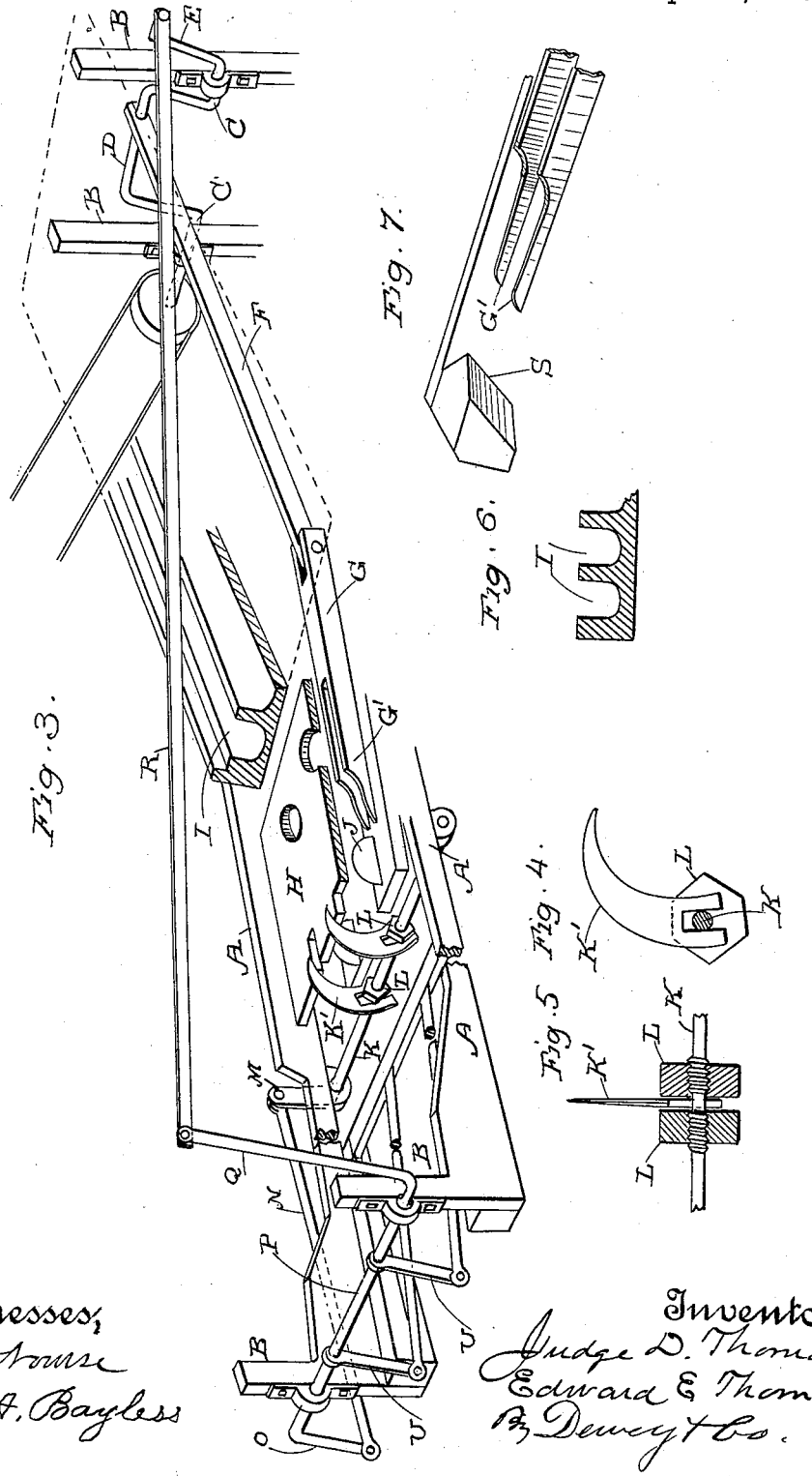
Witnesses:
Inventors,
Judge D. Thomas
Edward E. Thomas
By Dewey & Co.
Attys

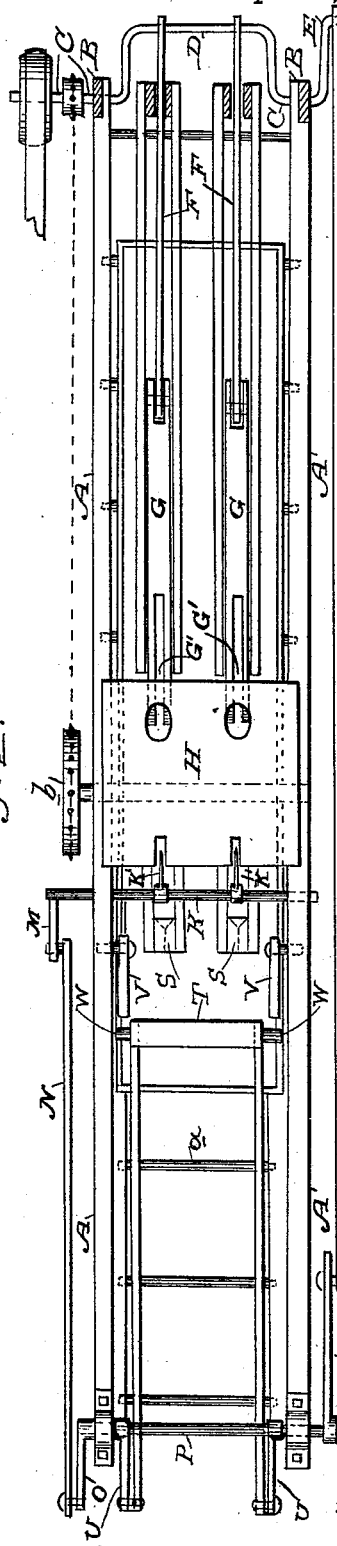
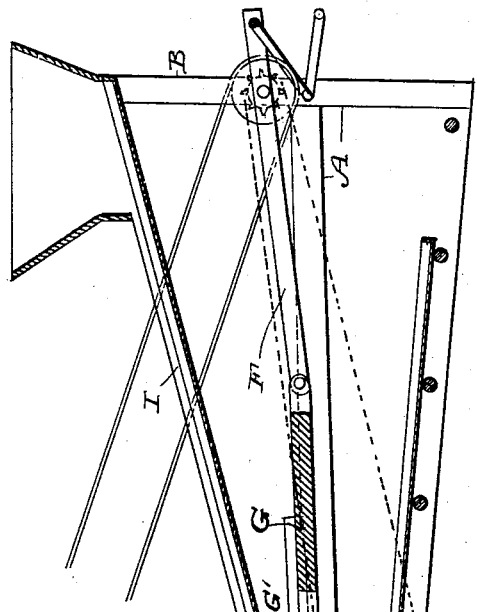

UNITED STATES PATENT OFFICE.

JUDGE D. THOMAS AND EDWARD E. THOMAS, OF SAN JOSÉ, CALIFORNIA.

FRUIT PITTING AND SPREADING MACHINE.

SPECIFICATION forming part of Letters Patent No. 482,284, dated September 6, 1892.

Application filed May 4, 1892. Serial No. 431,825. (No model.)

*To all whom it may concern:*

Be it known that we, JUDGE D. THOMAS and EDWARD E. THOMAS, citizens of the United States, residing at San José, Santa Clara county, State of California, have invented an Improvement in Fruit Pitting and Spreading Machines; and we hereby declare the following to be a full, clear, and exact description of the same.

Our invention relates to a novel apparatus for pitting and spreading fruit.

It consists in certain details of construction, which will be more fully explained by reference to the accompanying drawings, in which—

Figure 1 is a vertical section of our apparatus. Fig. 2 is a plan view. Fig. 3 is a perspective view showing the working parts of the machine. Fig. 4 is a view of the sickle-shaped knife and the way of securing it on the shaft. Fig. 5 is an edge view of the same. Fig. 6 is a transverse section of a part of the grader. Fig. 7 is a view of the spreader.

The object of our invention is to provide an apparatus which receives fruit—such as apricots, peaches, and similar fruits having stones or pits—from the grader, places the fruit in position with the pit or stone standing with its longest diameter vertical, and delivers the fruit in this position to the knives, which split it and separate the pit from the meat, which is then spread and delivered upon trays in which it is to be dried, or it may be delivered without spreading when designed for canning or similar purposes.

A A are the side timbers of the frame or table.

B B are standards or journal-box supports at opposite ends of the frame. At one end of the frame is a crank-shaft C, having cranks D and E. The cranks D have connecting-rods F uniting them with the horizontally-moving slides G. These slides move beneath a table H, having holes made in the top, into which the fruit is received. The fruit is delivered into these holes by inclined guide-channels I, which extend from the grader or other supply device to the table, as shown. These inclined delivery-channels are made of such shape, as shown in cross-section, that the fruit must turn, so that its greatest diameter will stand vertically before it can fall into these channels, and the fruit cannot move far lying transversely upon the channels before it will turn so as to automatically fall into them and stand on edge. In this position it rolls down and is delivered into the holes in the table H, previously described. The sliding reciprocating bars G are drawn back by the cranks D until the fruit falls into a curved, grooved, and slotted channel G' in the front end of each of the bars. These bars are preferably made of hickory or some tough elastic wood and have the front ends made with spring-steel plates, sufficiently separated to allow the knives and the pits of the fruit to pass between the two sides, or if any pits should accidentally get crosswise the elasticity of these plates would allow it to be forced through without breaking or damaging any of the parts. In the lower part of the framework and in line with the central portion of these reciprocating bars are fixed stationary knives J, over which the lower part of the fruit passes and by which it is slit open as it is forced to cross these knives by the movement of the reciprocating bars.

Beneath this frame is journaled a shaft K, having curved sickle-shaped knives K' secured to it. We have shown these knives having the ends slotted, so that they may be slipped over the shaft at any point, and they are then secured by means of nuts L, which are screwed up so as to clamp the knives tightly and hold them in place.

The shaft K is oscillated, so as to give the knives a semi-rotary motion about the axis of the shaft by means of a rocker-arm M, fixed to one end and a connecting-rod N uniting it with the rocker-arm O upon the shaft P. This shaft has a long rocker-arm Q at one end, and a connecting-rod R extends between this rocker-arm and the crank E upon the crank-shaft C, through which power is applied to operate the machine. By this means the shaft carrying the knives is given a partial rotation or oscillation about its center and the knives are moved, so that their curved or sickle-shaped edges are brought down upon the top of the fruit, which has already been slit or separated from below by the stationary knives J, and the peculiar movement of these concaved or sickle-shaped edges slits the upper part of the fruit in line with the slit already made from below, and as the edges of the knives strike the top of the pit it is forced downward between the elastic sides of the reciprocating bars G' and through corresponding slots made in the lower part of the table or frame. Beneath this table are fixed shallow transversely-sliding drawers into which the pits fall and which can be removed and discharged from time to time. As the two halves of the meat, now separated from the pits, are forced forward by the reciprocating carrying-bars for drying purposes, they pass the dividing wedge or share-shaped plates S, which present their inclined front edges to the two halves of the meats in such a way that as they are forced forward by the carriers they will be caused to fall outward from each other. At this point they are taken by the rakes T, the handles of which are connected with rocker-arms U upon the shaft P, which gives the rake a reciprocating motion.

V V are plates having their upper ends pivoted like pawls, and when the rakes are moved forward by the oscillation of the rocker-arms pins W, projecting from the sides, will move up the outer sides of these pawl-plates, which are then resting with their lower ends upon the table and standing at such an incline, as shown, that the rakes will be lifted upward as they are moved backward by the action of their rocker-arms. As the pins W pass over the upper ends of these plates they allow the rakes to drop upon the carriers, and they then begin to move backward as the carriers commence to recede from them, thus raking the fruit halves down and carrying them backward. The pins W, projecting from the sides of the rake, will pass beneath the swinging pawl-plates as the rakes move backward, so as to allow the rakes to be dragged along the table and carry the halves with them. These split fruits are deposited in the drying-trays by falling over the ends of the table into the trays. The tray is approximately about three feet wide by eight feet long, and it is moved up beneath the table upon which the fruit is spread and arranged by the pitters and rakes, so that the end of a tray is in position to receive the fruit as it falls from the table, and it is thus regularly laid in the tray in rows from one side to the other.

It will be understood that although we have shown but two of the pitting devices the apparatus will be made wide enough to carry as many of the cutting-knives and spreaders as will be necessary to fill the tray from one side to the other at each reciprocation. The tray is gradually moved backward, so that by the time another rakeful of fruit is drawn back a clear space is brought beneath the rear edge of the table, into which the next rakeful of fruit falls. In this manner the fruit is pitted, laid open, and spread and regularly placed upon each tray until it is full, when it may be carried off to the drying-grounds. The trays are moved gradually, either by some reciprocating mechanism acting intermittently and in conjunction with the operation of the parts hereinbefore described, or they may be moved slowly and regularly by means of carriers $a$, operated by sprocket-wheels $b$ and connecting-chain from a main driving-shaft.

It will be manifest that the shape of the knives may be varied to suit the conditions and size of fruit, and the mechanical devices by which the various movements are produced at the proper time may be easily altered to suit the conditions under which the work is being done. It will also be manifest that only so much of the machine need be used as will be necessary to pit the fruit without the rake or spreader, as when the fruit is to be canned, when these latter devices may be dispensed with.

Having thus described our invention, what we claim as new, and desire to secure by Letters Patent, is—

1. A fruit-pitting machine consisting of horizontal reciprocating vertically-slotted carriers having the elastic sides between which the pits fall, a table beneath which said carriers reciprocate, said table having holes made through its surface to receive the fruit and deliver it to the carriers, and inclined-channeled chutes in which the fruit is automatically placed with its longest diameter in a vertical position and by which it is delivered to the holes in the table, substantially as herein described.

2. It a fruit-pitting machine, the horizontally-reciprocating carriers having the front ends slotted vertically with elastic sides and the concaved depressions adapted to receive and retain the fruit, a table beneath which the carriers reciprocate, having holes made in it of such diameter as to allow the fruit to fall through the holes and guide it to the carriers, inclined chutes by which the fruit is automatically placed with its longest diameter in a vertical position and by which it is delivered into the openings in the table, stationary knives fixed in the table beneath the carriers, projecting upwardly in the slots in the same so as to split the lower part of the fruit as it is moved over them, and sickle-shaped knives fixed to a shaft journaled across the lower part of the table, with a means for partially rotating said shaft, whereby the edges of the knives are caused to split the upper part of the fruit and to press upon the pits and force them downward through the slotted front ends of the carriers and through the corresponding slots in the lower part of the frame, substantially as herein described.

3. In a fruit-pitting machine, the horizontally-reciprocating carriers having the slotted elastic front ends and concave depressions in which the fruit is received, the inclined delivery-channels by which the fruit is automatically arranged with its greatest diameter in a vertical direction and in which it is allowed to roll down a table having holes in line with the lower ends of the delivery-chutes, into which the fruit is received therefrom and by which it is delivered to the carriers, stationary knives by which the lower part of the fruit is split as it is forced over the knives by the movement of the carriers, sickle-shaped knives fixed to a shaft, by which they are caused to split the fruit from above and force the pits down between the elastic front ends of the carriers and the openings in the table, and receiving-trays placed beneath the table, into which the pits fall, substantially as herein described.

4. In a fruit-pitting machine, the horizontally-reciprocating carriers, the inclined feeding-channels by which the fruit is placed and delivered to the carriers, stationary and semi-rotating knives by which the fruit is split and the pits forced out of it, and inclined plates or shares by which the two parts of the fruit are separated and laid outwardly upon the table after being cut, substantially as herein described.

5. In a fruit-pitting machine, the reciprocating carriers, the inclined delivery-channels by which the fruit is delivered in proper position to the carriers, stationary and movable knives by which the fruit is split and the pits separated therefrom, inclined plates by which the two halves of the fruit are separated and laid side by side, and a reciprocating rake by which the fruit after being thus laid is drawn backwardly and delivered and arranged upon a tray beneath the table, substantially as herein described.

6. In a fruit-pitting machine, the carriers, the knives by which the fruit is split and the pits separated therefrom, means for turning the two halves of the fruit and laying it properly upon the table, a reciprocating rake, and the inclined pivoted plates upon each side of the table or frame, pins projecting from the sides of the rake, which move up the inclined plates as the rake moves toward the carriers and allows the rake to drop from the rear ends of said plates, so as to draw the fruit backward in its return stroke, the pins passing beneath the pivoted plates on the return movement, substantially as herein described.

7. In a fruit-pitting machine, the reciprocating carriers, knives by which the fruit is split and the pits removed therefrom, reciprocating rakes by which the fruit is drawn backward from the carriers and knives, carriers situated beneath the table, adapted to support drying-trays, and a means by which the tray is moved rearwardly during each reciprocation of the rake, whereby the fruit is evenly delivered and spread upon the trays, substantially as herein described.

In witness whereof we have hereunto set our hands.

JUDGE D. THOMAS.
EDWARD E. THOMAS.

Witnesses:
S. H. NOURSE,
J. A. BAYLESS.